United States Patent [19]
Possati, deceased et al.

[11] Patent Number: 5,123,173
[45] Date of Patent: Jun. 23, 1992

[54] APPARATUS FOR CHECKING FEATURES OF PARTS

[75] Inventors: Mario Possati, deceased, late of Bologna, Italy, by Gabriella Manfredi, Alberto Possati, Edoardo Possati, Marco Possati, Stefano Possati, heirs, all of Bologna, Italy

[73] Assignee: Marposs Societa' Per Azioni, S. Marino di Bentivoglio, Italy

[21] Appl. No.: 651,397

[22] PCT Filed: Jul. 15, 1989

[86] PCT No.: PCT/EP89/00828

§ 371 Date: Mar. 25, 1991

§ 102(e) Date: Mar. 25, 1991

[87] PCT Pub. No.: WO90/01674

PCT Pub. Date: Feb. 22, 1990

[30] Foreign Application Priority Data

Aug. 11, 1988 [IT] Italy .................. 3566 A/88

[51] Int. Cl.[5] .................................. G01B 7/12
[52] U.S. Cl. ........................ 33/555.1; 33/549; 33/605; 74/581
[58] Field of Search ............... 33/555.1, 555.2, 555.3, 33/549, 550, 551, 600, 605, 533, 555, 556; 74/581

[56] References Cited

U.S. PATENT DOCUMENTS

| | | |
|---|---|---|
| 3,568,372 | 3/1971 | Asano et al. |
| 3,863,350 | 2/1975 | Solaroli . |
| 3,936,946 | 2/1976 | Ruffner et al. .................. 33/556 |
| 4,351,115 | 9/1982 | Possati ............................ 33/555.3 |
| 4,569,248 | 2/1986 | Hug . |
| 4,625,429 | 12/1986 | Danielli ........................... 33/504 |
| 4,674,193 | 6/1987 | Wartepny et al. .............. 33/550 |

FOREIGN PATENT DOCUMENTS

| | | |
|---|---|---|
| 0137921 | 4/1985 | European Pat. Off. . |
| 2045935 | 11/1980 | United Kingdom . |
| 2129131 | 5/1984 | United Kingdom . |

Primary Examiner—William A. Cuchlinski, Jr.
Assistant Examiner—C. W. Fulton
Attorney, Agent, or Firm—Stevens, Davis, Miller & Mosher

[57] ABSTRACT

Checking apparatus comprising a support (1); sensing means (19; 71) adapted to provide signals depending on the features of the checked parts (3) with reference means (41, 42; 70) adapted to cooperate with the parts; and connection means (30; 66; 93) with resiliently deformable portions (34, 35; 69, 69' . . . ; 94, 94', . . .) for connecting the sensing means to the support and enabling the reference means to properly cooperate with the parts through substantially rotary displacements about parallel geometric axes. In order to diminish the influence of plays and frictions and enable checkings—possibly combined checkings—featuring high accuracy and repeatability, the connection means comprise an element (30; 66; 93) having two legs (31, 33; 67, 68; 93), the element being substantially rigid, apart from a plurality of integral zones having reduced thickness, that define said resiliently deformable portions.

19 Claims, 4 Drawing Sheets

APPARATUS FOR CHECKING FEATURES OF PARTS

TECHNICAL FIELD

The invention relates to an apparatus for checking features of parts, with a support; sensing means with reference means adapted to cooperate with the part to be checked, to provide signals depending on said features; and connection means for connecting the sensing means to the support, the connection means comprising an element with an end coupled to the support, another end coupled to the reference means, and resiliently deformable portions for enabling the reference means to properly cooperate with the part, through the combination of substantially rotary displacements about parallel geometric axes.

BACKGROUND ART

An apparatus of this kind is known from U.S. Pat. No. 3,568,372.

The apparatuses for checking features of parts, for example the apparatuses for checking linear dimensions and geometrical and shape features of parts, must sometimes be provided with means for enabling the mutual fitting between the part and the sensing means, for guaranteeing the proper positioning of the sensing means and consequently the proper checking.

A typical case in which this need arises relates to the automatic dynamical checking of linear dimensions and/or geometrical and/or shape features of crankpins of crankshafts. The crankshaft is located on the apparatus, for example on Vee rests or between two centres, so as to enable its rotation about the geometrical axis defined by the main journals.

Then the sensing means, constituted in particular by comparator gauging heads with contact feelers for checking linear dimensions, are displaced into cooperation with the crankpins and the checkings are performed in dynamical conditions. Of course, since the crankpins rotate eccentrically with respect to the rotation axis of the crankshaft, it is necessary that the sensing means may move with respect to the frame or bed of the apparatus, for following said eccentric movement.

For this end, in accordance with U.S. Pat. No. 4,351,115, the sensing means are coupled to Vee reference and support devices, that cooperate with the surfaces of the crankpins, and each Vee reference and support device is carried by a connection device including two legs coupled to each other by a cylindrical hinge. Another cylindrical hinge couples the end of one of the legs to the apparatus frame. During rotation of the crankshaft, that is horizontally arranged, the two hinges enable the reference and support devices and the sensing means to follow the eccentric movement of the crankpins. The reference and support devices and the connection devices are arranged above the part and the reference and support devices rest on the crankpins due to the forces of gravity.

A drawback of this apparatus, which is particularly grave when it is desired to perform combined checkings, for example checking of the parallelism among the geometrical axes of the main journals and those of the crankpins, derives from the use of cylindrical hinges obtained through ball bearings. In order to limit backlash and friction, it is necessary to use pre-loaded precision ball bearings and frequently perform their maintenance. This implies high costs and in any case, since it is not possible to fully eliminate plays and friction, the precision and repeatability of some checkings are poor.

In the above mentioned U.S. Pat. No. 3,568,372 there is described, among other things, an electronic comparator gauge for external cylindrical grinders comprising a reference and supporting device with two shoes arranged in a V configuration, a feeler horizontally movable along the V bisecting line and a device for supporting the feeler and a corresponding transducer, as well as the reference and supporting device.

The device supporting the feeler is housed with radial play within a conical seat of a movable support constituted by a slide actuated by a hydraulic cylinder and can be advanced, with respect to the slide, by a stepping motor, for keeping the shoes into contact with the part during the grinding operation. Both the shoes are maintained into contact due to connection means comprising two leaf springs having the ends respectively locked to the device supporting the feeler and to the slide. In rest conditions the springs substantially take the shape of half cylinders and can undergo resilient deformations to maintain said contact. An excessive deformation of the springs can be detected through a strain gauge transducer fixed to one of the springs.

This arrangement only permits small displacements of the shoes and the gauge, as a whole, is not adapted to check sections of a part rotating with considerable eccentricity about a main rotation axis of the part.

DISCLOSURE OF INVENTION

The invention intends to provide an apparatus of the type set forth, with connection means permitting considerable deformations, very sturdy and involving negligible backlash and friction, to the benefit of repeatability and accuracy of the checkings.

According to the invention, an apparatus for checking features of parts comprises a support, sensing means with reference means adapted to cooperate with the part to be checked, to provide signals depending on said features, and connection means for connecting the sensing means to the support. The connection means comprise a connection element with an end coupled to the support, the other end coupled to the reference means, and resiliently deformable portions for enabling the reference means to properly cooperate with the part, through the combination of substantially rotary displacements about parallel geometric axes. The connection element is substantially rigid, apart from a plurality of distinct zones with reduced thickness adapted to define said resiliently deformable portions.

The connection means according to the invention, in addition to the absence of backlash and friction, guarantee high sturdiness and negligible effects due to vibrations and resonances and can be made so as to offer considerable resistance to torsional stress. The absence of significant torsional deformations permits performing combined checkings, like for example, the parallelism among the geometrical axes of the main journals and the crankpins of a crankshaft.

According to a further feature of the invention, the connection means comprise limiting means adapted to guarantee resistance to tensile stresses and/or combined bending and compressive stresses, thus further increasing the ruggedness of the apparatus and rendering it particularly adapted for automatic checkings in workshop environment. The limiting means can be designed so as to have modular structure and quite small overall dimensions.

BRIEF DESCRIPTION OF DRAWINGS

The invention is now described in detail, with reference to two embodiments shown in the annexed drawings, wherein.

BEST MODES FOR CARRYING OUT THE INVENTION

The measuring station visible in FIGS. 1 to 4 comprises supporting means including a support frame 1 carrying two Vee shaped devices 2, for supporting the part 3 to be checked.

Parts 3 are constituted by crankshafts and are loaded in such a way that two main journals rest on corresponding Vee shaped devices 2.

Among other things, the measuring station is for checking diameters of crankpins, in particular of crankpin 4. In this case the checking is of statical type, i.e. is performed with the workpiece not rotating. However, in order to render simpler the structure of the means supporting the measuring means, there are foreseen loading and reference devices—not shown—adapted to load the crankshaft with a pre-set angular phase.

Figure 2:
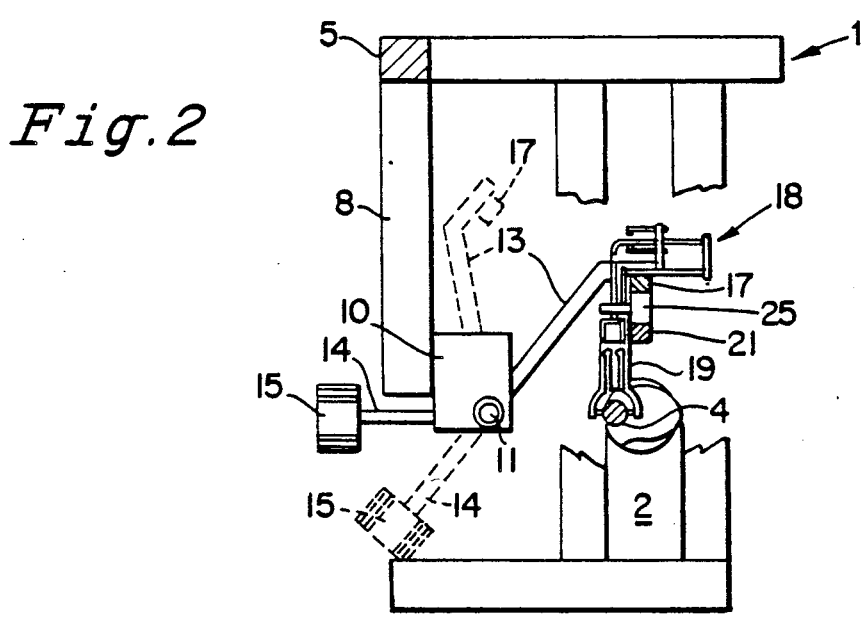
FIG. 2 is a cross-section along line II—II of the bench of FIG. 1.

An upper horizontal beam 5 of frame 1 supports two vertical bars 7, 8 carrying at their lower ends corresponding support devices 9, 10, that house corresponding pins, one of which, 11, is visible in FIG. 2.

Fixed to the pins are two arms 12, 13—which, as is described hereinafter, carry measuring heads—and two further arms carrying counterweights at their ends. One of the arms carrying the counterweights and the corresponding counterweight are visible in FIG. 2 and indicated by reference signs 14, 15.

A beam 17 has its ends fixed to the free ends of arms 12, 13 and therefore can rotate, while remaining horizontally arranged, about the geometric axis defined by support devices 9, 10 and corresponding pins 11.

Figure 1:
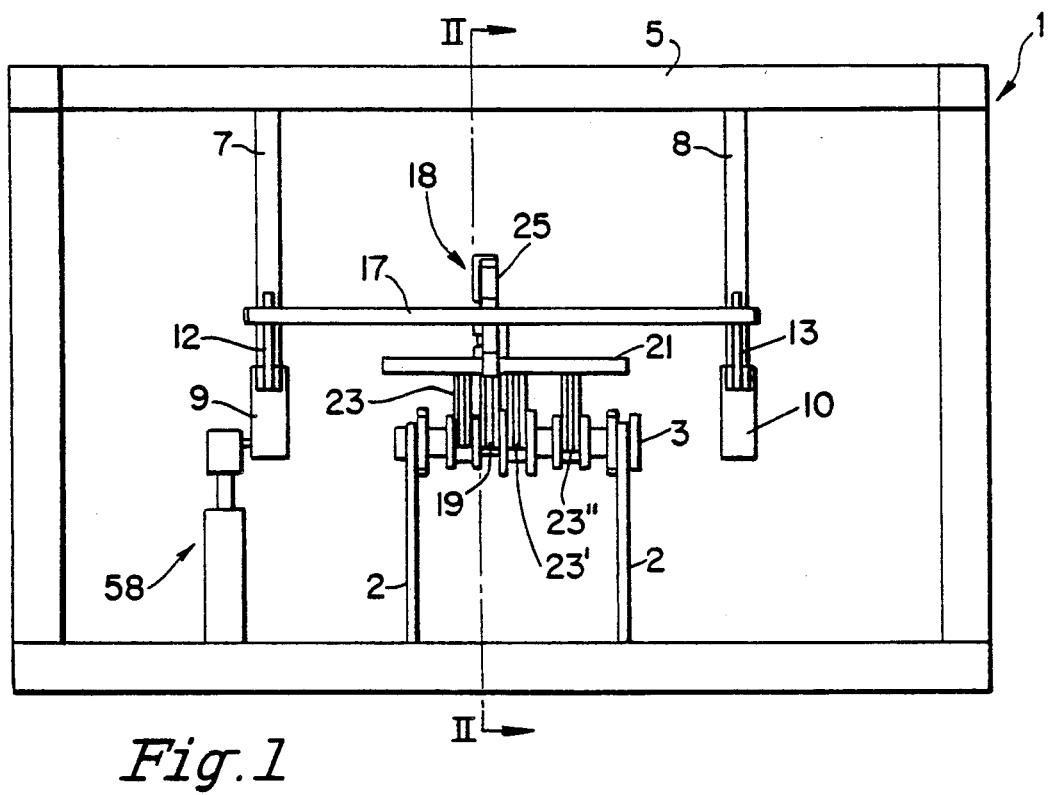
FIG. 1 is a schematic front view, showing a portion of a measuring bench or station for statically checking linear dimensions of a crankshaft.

Directly secured to beam 17 are connection devices or means carrying multiple measuring heads adapted to check diameters of the crankpins. For simplicity's sake, only one connection device 18 and one corresponding multiple measuring head 19 are shown in FIGS. 1 and 2.

A frame 21 comparable to a horizontal beam carries further multiple measuring heads 23, 23′, 23″, etc., arranged for checking diameters of the main journals of part 3. Frame 21 is secured through a bar 25 to beam 17.

The apparatus may comprise further measuring heads for checking longitudinal dimensions of part 3 and/or for other checkings, but these heads are not shown, for simplicity's sake.

Figure 3:
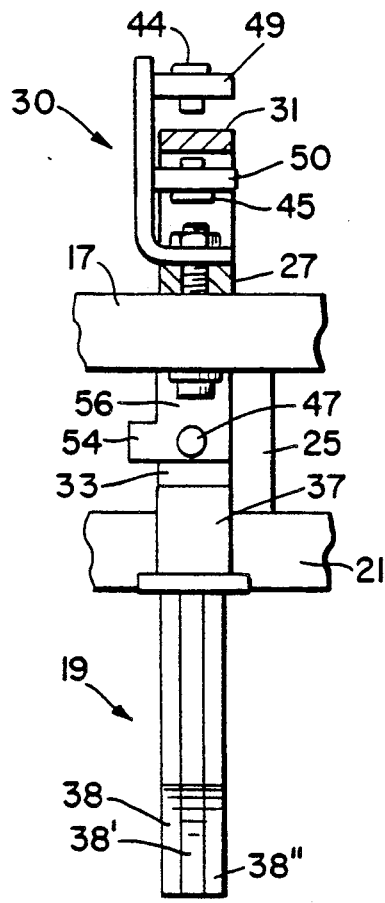
FIG. 3 shows, with scale enlarged with respect to FIGS. 1 and 2, a view of a detail of the bench of the preceding figures.
Figure 4:
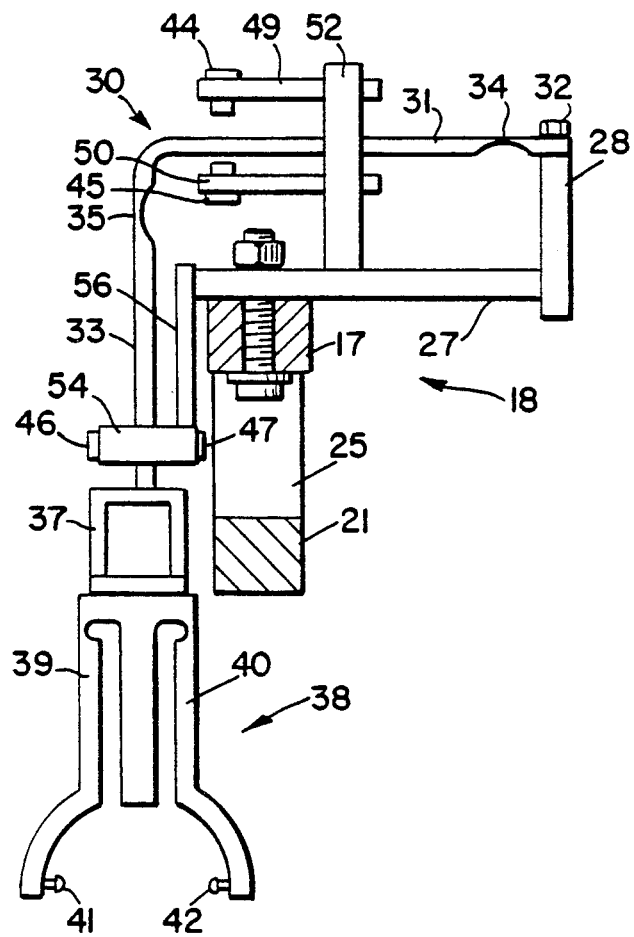
FIG. 4 is a side view of the detail of FIG. 3.

With reference to FIGS. 3 and 4, connection device 18 comprises a cross-piece 27 secured to beam 17, a stanchion 28 welded to cross-piece 27 and a connection element 30, substantially L-shaped.

Connection element 30, constituted by a single piece of spring steel, comprises an arm 31, having an end fixed to stanchion 28 by screws 32, and another arm 33.

Arm 31 has a portion 34, in which, through milling and subsequent grinding, is obtained a concave lightening that defines a rotation fulcrum next to stanchion 28. In its turn, arm 33 has a portion 35 in which, through milling and grinding, is obtained a concave lightening that defines a rotation fulcrum next to arm 31.

Measuring head 19 comprises a base 37 fixed to the lower end of arm 33 and three measuring cells 38, 38′, 38″, each having two movable arms 39, 40, with relevant feelers 41, 42 adapted to contact diametrically opposite points of crankpin 4.

Connection device 18 further comprises limiting means for limiting the deformations of portions 34, 35 so as not to exceed the elastic limit. The limiting means comprise two screws 44, 45 adapted to cooperate with opposite sides of arm 31 and two screws 46, 47 adapted to cooperate with opposite sides of arm 33.

Screws 44, 45 are adjustably secured to two bars 49, 50 fixed to a stanchion 52 fastened to cross-piece 27.

Screws 46, 47 are adjustably secured to a support element 54 fixed to a bar 56 fastened to cross-piece 27.

The apparatus further comprises a driving device 58 for controlling the rotation of arm 12 and consequently the corresponding rotations of arm 13, beam 17 and of the measuring heads, from the rest position partially shown with short dashes in FIG. 2 to the measuring position shown in FIG. 1 and with a continuous line in FIG. 2, and vice versa.

Part 3 is loaded when arms 12, 13, beam 17, etc. are in the rest position. Then driving device 58 displaces the measuring heads, in particular head 19, to the measurement position. The feelers of the measuring heads, in particular feelers 41, 42 act as sensing means, and as reference means both for the proper approach onto part 3 and for taking the measurement.

Connection device 18 contributes for the proper contacting of feelers 41, 42 onto part 3.

In fact, portions 34, 35 can undergo elastic deformations if the angular phase of crankshaft 3 differs from the nominal one, or there are deviations in the eccentricity of the crankpins with respect to the geometrical axis defined by the main journals. To a certain extent, this even permits checking crankshafts with different nominal values of the eccentricity of the crankpins.

The bench shown in FIGS. 5 to 8 is designed for dynamically checking linear dimensions and other geometric and shape features of a crankshaft. Since the bench also comprises heads for dynamically checking the diameters of the crankpins, the connection means that connect these heads to the support structure must allow considerable displacements, in view of the eccentric rotation of the crankpins.

Figure 5:
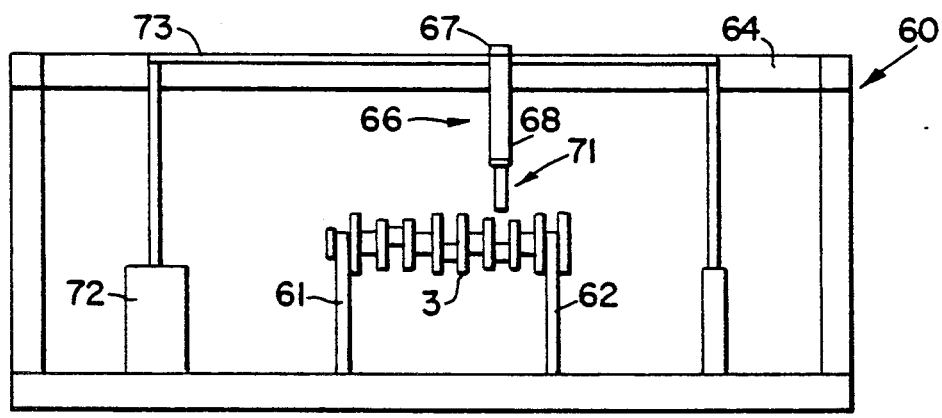
FIG. 5 is a schematic front view of a measuring bench or station for the dynamic checking of linear dimensions of a crankshaft, according to the preferred embodiment of the invention, for the case when there are needed connection means adapted to guarantee considerable displacements.
Figure 6:
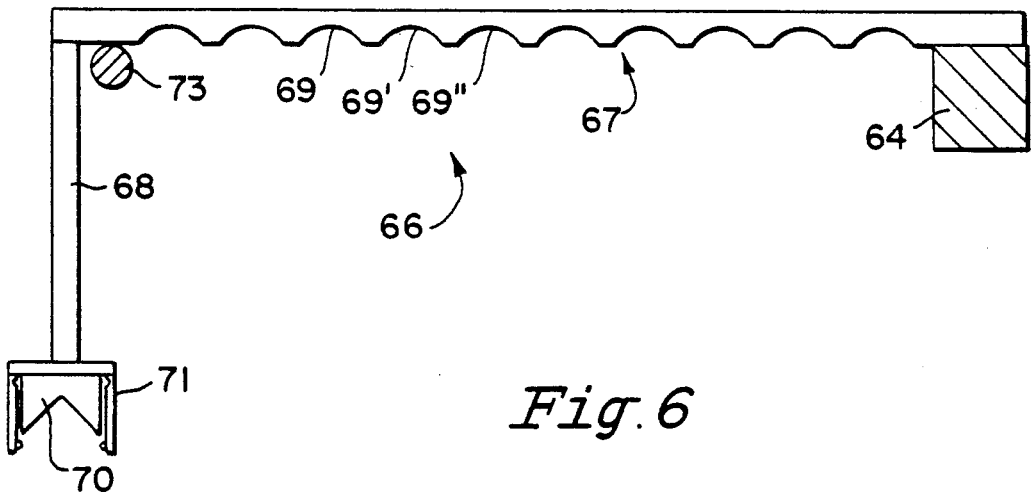
FIG. 6 is a side view, with enlarged scale, of the connection means of FIG. 5.

FIG. 5 is very schematic and several components have not been represented, for simplicity's sake, because it is deemed sufficient to mainly illustrate the using conditions, the structure and the operation of said connection means.

The bench comprises a support structure or frame 60, that carries two Vee rest devices 61, 62 adapted to define, by cooperating with corresponding main journals, the rotation axis of the crankshaft, that substantially coincides with the main geometric axis of the same crankshaft. The crankshaft is driven into rotation by a driving device of a known type, not shown.

Fixed to an upper beam 64 of frame 60 are connecting devices that carry the sensing means, i.e. the heads for checking the crankpins. Only one, 66, of these connecting devices is shown in FIG. 5.

Connecting device 66 comprises an integral element constituted by a bar 67 having an end fixed to beam 64, and a second end whereto is secured a bar 68. In bar 67, made of spring steel, there are obtained, by milling and subsequent grinding, recesses having a determined bending radius, and thus lightened portions 69, 69', 69'', ..., that define corresponding rotation fulcrums. The fulcrums, the number of which depends of course from the dimensions and weight of the part and of the bench components, define corresponding parallel, rotation geometric axes, which in the conditions where portions 69, 69', 69'', ... are not subjected to deformations are arranged at equal distances, in a horizontal plane. In these conditions bars 67 and 68 are respectively arranged in horizontal and vertical positions.

For example, lightened portions 69, 69' ... may be about ten, thus enabling a satisfactory compromise between a good flexibility and a high stiffness in the relevant zones and directions for which high stiffness is desirable. Of course, the most favourable number of lightened sections can vary, because it depends from many factors, but is preferably comprised between six and fifteen.

Fixed to the lower end of bar 68 are a Vee reference device 70 adapted to cooperate with the cylindrical surface of the corresponding crankpin and a multiple measuring head 71 having a plurality of armsets and movable feelers for checking diameters of the crankpin.

Support frame 60 supports a hydraulic cylinder device 72 adapted to lift or lower a horizontal rod 73.

On its turn rod 73 can displace upwards bar 68, by cooperating with the end of bar 67 and causing the deformation of lightened portions 69, 69', 69''. In this way it is possible to load and unload part 3 avoiding any interference with the sensing means, i.e. with reference means or devices 70 and measuring heads 71.

When rod 73 is arranged in the lower position, the reference means, i.e. reference devices 70, go down onto the corresponding crankpins of shaft 3, since lightened portions 69, 69', 69'', undergo deformations due to the weight of the elements carried by rod 67 and the weight of the same rod 67.

The plurality of the fulcrums defined by bar 67 permits both proper contact making of reference device 70 —even if the initial angular phase of crankshaft 3 is not pre-set—and keeping the proper cooperation between reference device 70 and measuring head 71 during the rotation of crankshaft 3.

Figure 7:
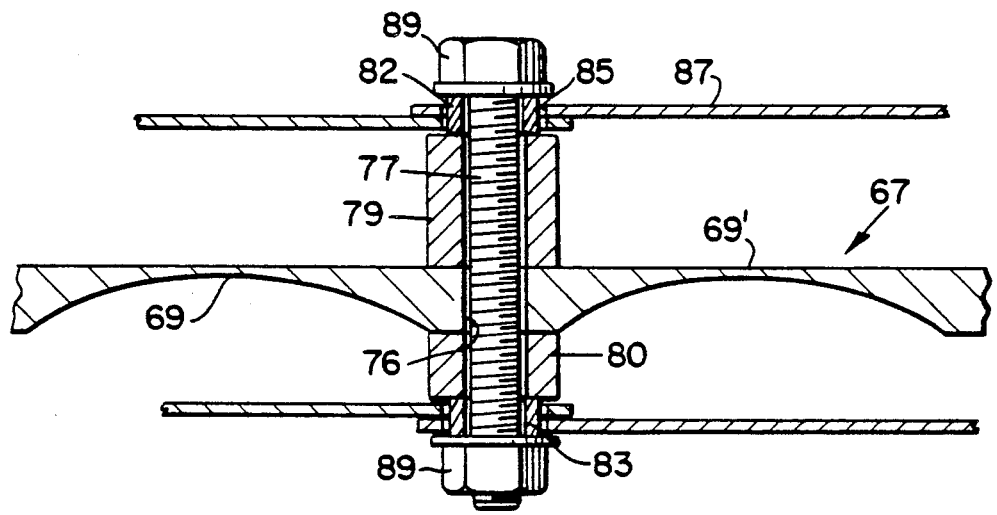
FIG. 7 is a detail, further enlarged, of the connection means of FIG. 5 also including limiting means.
Figure 8:
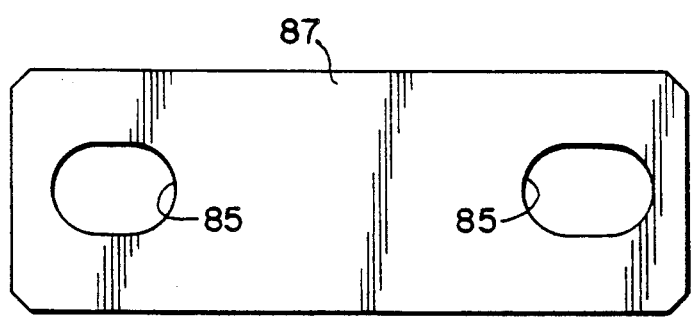
FIG. 8 is a plan view of a limiting element of the connection means of FIG. 7.
Figure 9:
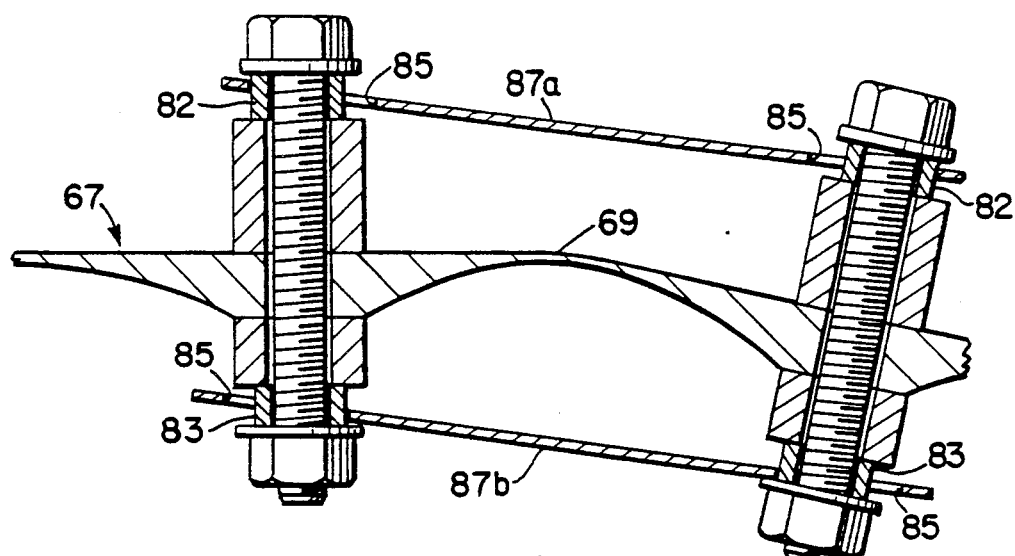
FIG. 9 illustrates the operation of the limiting means of FIGS. 7 and 8.

In order to protect the fulcrums of bar 67 from unelastic deformations, that might be caused by impacts or false moves, there are provided limiting means, that are now described with particular reference to FIGS. 7 to 9.

Through holes 76 housing threaded stems 77 are obtained in the rigid portions at the ends of bar 67 and in those connecting adjacent pairs of lightened portions 69, 69', 69'', . . . . Perforated spacers or studs 79, 80, having different lengths, encircle each stem 77, at the two sides of bar 67. The inner ends of spacers 79, 80 go into contact with the two sides of the corresponding rigid portion, while into contact with the outer ends there are spacing collars 82, 83 about which are inserted slots 85 of pairs of limiting elements 87, made of spring steel. Then locking devices or nuts 89 are screwed at the ends of stems 77 for locking spacing collars 82, 83 against spacers 79, 80 and the latter against the sides of the corresponding rigid portion of bar 67.

Slots 85 have dimensions such as to provide some longitudinal play with respect to collars 82, 83. Moreover, the thickness of each limiting element 87 is lower than half of the thickness of a spacing collar 82 or 83, so as to permit short longitudinal mutual displacements of slots 85 with respect to collars 82, 83. Upper spacers 79 are longer than lower spacers 80. In fact, since lightened portions 69, 69', 69'' ... are obtained by recesses at a single side (the lower side) of bar 67, when lightened portions 69, 69' ... undergo deformations, the corresponding neutral lines are upwards offset with respect to the line or surface passing through the centre line of the rigid portions of bar 67.

When lightened portions 69, 69', 69'', ... undergo deformations so as to cause the limiting means to operate, ends of slots 85 enter into contact with spacing collars 82, 83. In particular, FIG. 9 shows the operation of two limiting elements 87, of which the upper one is denoted by reference sign 87a and the lower one by reference sign 87b.

Bar 67 as shown in FIG. 9 is bent (due to the weight of the same bar 67 and that of the elements carried by it) in such a way that Vee reference device 70 is arranged at its lowermost portion; this situation normally corresponds to the absence of part 3 and to the lower position of rod 73. The outer ends of slots 85 of element 87a are into contact with the corresponding spacing collars 82 and the inner ends of slots 85 of element 87b are into contact with corresponding spacing collars 83. Element 87a acts as a tension rod and element 87b as a compression rod.

In this way excessive tensile and compressive stresses in lightened portion 69 are avoided. It is evident that when reference device 70 is displaced upward so as to cause the limiting device to operate, element 87a acts as a compression rod and element 87b as a tension rod.

In the two limit conditions, notwithstanding the asymmetry of lightened portion 69—which is due to a recess at a single side of bar 67—, the action of elements 87a and 87b is symmetrical, because they are located at the same distance from the neutral line of lightened portion 69.

Figure 10:
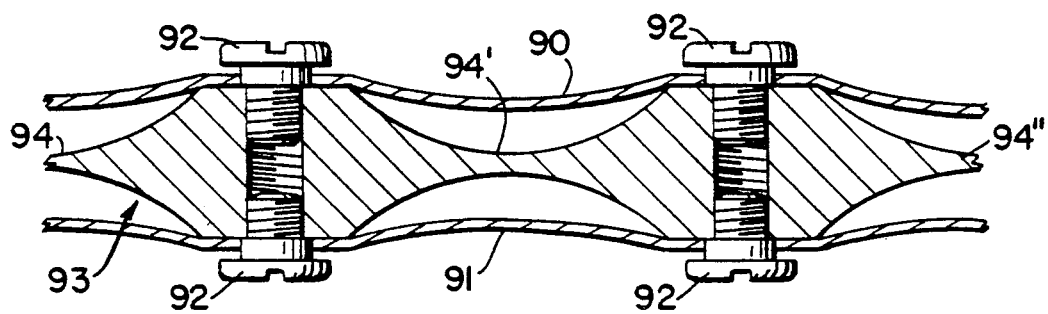
FIG. 10 is a detail of a connection element with limiting means made according to a variant with respect to FIGS. 7 to 9.

According to the variant of FIG. 10, the limiting means are obtained through two flexible steel tapes 90, 91 having holes for the passage of screws 92 for locking to flexible bar 93. In this case flexible bar 93 has a symmetrical structure, with opposite pairs of recesses, having a determined bending radius, at the two bar sides. The neutral line of lightened portions 94, 94', 94'' ... of bar 93 is located in correspondence with the centre line of the rigid portions of bar 93. Flexible tapes 90, 91 prevent the occurrence of tensile stresses in lightened portions 94, 94′, 94″ . . . , but cannot limit compressive stresses. In fact, when the upper tape 90 and the lower tape 91 are subjected to tensile stresses, lightened portions 94, 94′, 94″, . . . are subjected to compressive stresses.

However, by suitably combining limiting elements 87 of FIGS. 7 to 9 with bar 93 of FIG. 10, it is possible to effectively limit both tensile and compressive stresses in lightened portions 94, 94′, 94″ . . . without using extensions or studs·similar to threaded stems 77. Elements 87 can be arranged close to the sides of bar 93.

Figure 11:
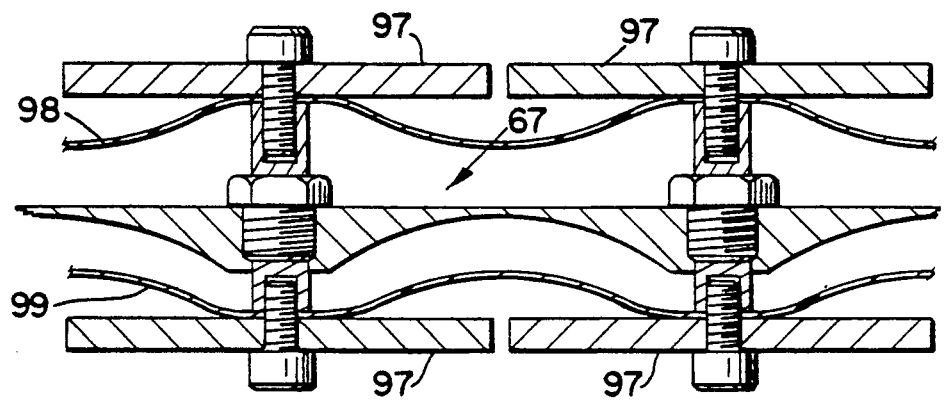
FIG. 11 shows a detail of a connection element with limiting means made according to another variant.

According to the further variant of FIG. 11, the limiting means can comprise a set of bars 97, that for each adjacent pair act as compression rods, and two flexible tapes 98, 99 secured to each rigid portion of a bar 67 identical to that of FIGS. 5 to 9. The sections of tapes 98, 99 between two adjacent rigid portions are longer than the corresponding section of bar 67. Tapes 98, 99 act as tensile rods.

What is claimed is:

1. Apparatus for checking features of parts, with a support (1); sensing means (19; 71) with reference means (41, 42; 70) adapted to cooperate with the part (3) to be checked, to provide signals depending on said features; and connection means for connecting the sensing means to the support, the connection means comprising a connection element (30; 66; 93) with an end coupled to the support, the other end coupled to the reference means, and resiliently deformable portions (34, 35; 69, 69′, . . . ; 94, 94′, . . . ) for enabling the reference means to properly cooperate with the part, through the combination of substantially rotary displacements about parallel geometric axes, characterized in that said element is substantially rigid, apart from a plurality of distinct zones (34, 35; 69, 69′, . . . ; 94, 94′, . . . ) with reduced thickness adapted to define said resiliently deformable portions and wherein said element comprises two legs (67, 68) elongated along corresponding different directions and said resiliently deformable portions (69, 69′, . . . ; 94, 94′, . . . ) are integral portions of at least one (67; 93) of the legs, thereby to permit proper cooperation of the reference means with parts having eccentric portions arranged in variable checking positions and with eccentric portions of rotating parts.

2. An apparatus according to claim 1, wherein said resiliently deformable portions (69, 69′, . . . ; 94, 94′, . . . ) are integral portions of one (67; 93) of the legs.

3. An apparatus according to claim 2, wherein one (67) of said legs is coupled to the support (1) and the other (68) carries the reference means (70), the resiliently deformable portions (69, 69′; . . . ) being integral portions of the leg coupled to the support.

4. An apparatus according to claim 3, wherein, in conditions of absence of deformations in said resiliently deformable portions (69, 69′; . . . ), said legs (67, 68) are substantially perpendicular to each other.

5. An apparatus according to claim 2, for checking shaft-like parts (3) defining a main geometric axis and portions eccentric with respect to this axis, wherein the part to be checked (3) is horizontally arranged and is rotated about the main geometric axis, and the reference means comprise Vee reference devices (70) carried by one of said legs (68) and adapted to cooperate with said eccentric portions, the leg (68) carrying the Vee reference devices being arranged, substantially, along a vertical direction.

6. An apparatus according to claim 5, wherein the parts are constituted by crankshafts (3) and the sensing means (71) with the reference means (70) are adapted to cooperate with crankpins of the crankshaft, for checking linear dimensions of the crankpins.

7. An apparatus according to claim 1, wherein said connection means comprise limiting means (44–47;. 87; 90, 91; 97-99) for limiting the deformations of at least one of said resiliently deformable portions (34, 35; 69, 69′, . . . ; 94, 94′, . . . ), the limiting means comprising at least a first limiting element (87a; 90; 98) coupled to said connection element.

8. An apparatus according to claim 7, wherein the limiting means (87; 90, 91; 97-99) are adapted to separately limit the deformations of corresponding resiliently deformed portions.

9. An apparatus according to claim 8, wherein the limiting means comprise at least a second limiting element (87b, 91, 99), the first and the second limiting elements being arranged at opposite sides with respect to the connection element.

10. An apparatus according to claim 7, wherein the limiting means (87; 90-99) are adapted to limit tensile and compressive stresses in said resiliently deformable portions (69, 69′, . . . ; 94, 94′ . . . ).

11. An apparatus according to claim 1, wherein said connection means comprise limiting means for limiting the deformations of said resiliently deformable portions, the limiting means comprising limiting elements (87; 90, 91; 97-99) arranged at opposite sides of said connection element, and coupling devices (77, 79, 80, 82, 83, 88) for coupling the limiting elements to rigid portions of the connection element adjacent to corresponding resiliently deformable portions.

12. An apparatus according to claim 11, wherein said limiting elements define slots (85) having ends adapted to cooperate with said coupling devices, for permitting limited longitudinal displacements of the limiting elements.

13. An apparatus according to claim 12, wherein said limiting elements are basically constituted by flexible metal laminae (87) adapted to take tensile and compressive stresses.

14. An apparatus according to claim 1, wherein said connection means comprise limiting means for limiting the deformations of said resiliently deformable portions, the limiting means comprising two limiting elements constituted by two flexible tapes (90, 91; 98, 99) arranged at opposite sides with respect to the connection element (67; 99) and coupling devices (92) for coupling said tapes to rigid portions of the connection element, the tapes being longer than the corresponding section of the connection element and being adapted to take tensile stresses for limiting the tensile stresses in the resiliently deformable portions.

15. An apparatus according to claim 14, wherein the limiting means comprise further limiting elements constituted by a plurality of bars (97) fixed to the rigid portions of the connection element adjacent to the resiliently deformable portions, at opposite sides with respect to the connection element, the ends of the bars arranged at the same side with respect to the connection element being adapted to mutually cooperate for preventing the occurrence of compressive stresses in said resiliently deformable portions.

16. An apparatus according to claim 15, wherein said coupling devices are also adapted to secure said bars to the connection element.

17. An apparatus according to claim 11, wherein said coupling devices comprise studs (77) substantially perpendicular to the connection element for locating the limiting elements at a pre-set distance from the connection element.

18. An apparatus according to claim 1, wherein said connection element (93) comprises a portion having a thickness substantially constant, apart from said plurality of zones with reduced thickness, the resiliently deformable portions being defined by opposite pairs of recesses having a determined bending radius.

19. An apparatus according to claim 1, in which there are about 10 integral zones (69, 69', ... ; 94, 94', ... ) with reduced thickness.

* * * * *